US009989971B2

(12) United States Patent
Chinomi et al.

(10) Patent No.: US 9,989,971 B2
(45) Date of Patent: Jun. 5, 2018

(54) VEHICLE MANAGEMENT SYSTEM AND VEHICLE MANAGEMENT METHOD

(71) Applicant: Nissan Motor Co., Ltd., Kanagawa (JP)

(72) Inventors: Satoshi Chinomi, Kanagawa (JP); Kayoko Hara, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 19 days.

(21) Appl. No.: 15/028,056

(22) PCT Filed: Sep. 29, 2014

(86) PCT No.: PCT/JP2014/075882
§ 371 (c)(1),
(2) Date: Apr. 8, 2016

(87) PCT Pub. No.: WO2015/053123
PCT Pub. Date: Apr. 16, 2015

(65) Prior Publication Data
US 2016/0246303 A1     Aug. 25, 2016

(30) Foreign Application Priority Data

Oct. 10, 2013   (JP) ................................ 2013-212487

(51) Int. Cl.
*G06Q 10/02*   (2012.01)
*B60L 11/18*   (2006.01)
(Continued)

(52) U.S. Cl.
CPC ........ *G05D 1/0276* (2013.01); *B60L 11/1851* (2013.01); *G06Q 10/06* (2013.01); *G06Q 50/00* (2013.01); *G07B 15/00* (2013.01)

(58) Field of Classification Search
CPC ........ B60L 11/18; B60L 11/184; G06F 17/00; G06Q 50/00
(Continued)

(56) References Cited

U.S. PATENT DOCUMENTS 5,812,070 A    9/1998   Tagami et al.
6,157,315 A *  12/2000  Kokubo ................. G07B 15/00
                                                         211/5
(Continued)

FOREIGN PATENT DOCUMENTS

JP    5-159143 A    6/1993
JP    8-44801 A     2/1996
(Continued)

OTHER PUBLICATIONS

International Preliminary Report on Patentability issued in corresponding Application No. PCT/JP2014/075882, dated Apr. 12, 2016 (9 pages).

*Primary Examiner* — Thomas G Black
*Assistant Examiner* — Wae L Louie
(74) *Attorney, Agent, or Firm* — Osha Liang LLP

(57) ABSTRACT

A vehicle management system for managing vehicles used by users has a usage managing unit configured to accept a user's request for using to use one of the vehicles, and manage the vehicles and parking spaces in which the vehicles are parked, an acquisition unit configured to acquire energy information from the vehicles, the energy information indicating a remaining amount of energy used for traveling of the vehicle, a determination unit configured to compare the remaining amount acquired by the acquisition unit with a remaining amount threshold that represents a shortage of energy, determine that the vehicle needs supply of energy when the remaining amount is lower than the remaining amount threshold, and specify a recovery vehicle that has been determined as needing supply of energy as a (Continued)

recovery vehicle, and a command outputting unit configured to output a recovery command for recovering the recovery vehicle from the parking space.

9 Claims, 7 Drawing Sheets

(51) Int. Cl.
  *G05D 1/02* (2006.01)
  *G06Q 10/06* (2012.01)
  *G06Q 50/00* (2012.01)
  *G07B 15/00* (2011.01)
(58) Field of Classification Search
  USPC .................. 340/5.4, 988; 348/148; 45/41.2; 701/300
  See application file for complete search history.

(56) References Cited

U.S. PATENT DOCUMENTS

| | | | |
|---|---|---|---|
| 6,177,879 B1* | 1/2001 | Kokubu | B60L 11/1801 340/432 |
| 6,696,981 B1* | 2/2004 | Hashimoto | G06Q 10/02 235/384 |
| 2008/0040223 A1* | 2/2008 | Bridges | B60L 11/1816 705/14.69 |
| 2012/0123670 A1* | 5/2012 | Uyeki | B60L 11/1838 701/300 |
| 2013/0031121 A1* | 1/2013 | Sera | G06Q 10/00 707/758 |
| 2013/0063283 A1* | 3/2013 | Kashima | B60L 3/12 340/988 |
| 2013/0217332 A1* | 8/2013 | Altman | H04H 60/90 455/41.2 |
| 2014/0247348 A1* | 9/2014 | Moore, Jr. | G06F 17/00 348/148 |
| 2016/0280092 A1* | 9/2016 | Jefferies | B60L 11/184 |
| 2016/0288657 A1* | 10/2016 | Tokura | B60L 11/182 |

FOREIGN PATENT DOCUMENTS

| | | |
|---|---|---|
| JP | 2011-128987 A | 6/2011 |
| JP | 2013-191004 A | 9/2013 |

* cited by examiner

VEHICLE MANAGEMENT SYSTEM AND VEHICLE MANAGEMENT METHOD

CROSS-REFERENCE TO RELATED APPLICATIONS

This application is a national stage application of PCT/JP2014/075882 filed Sep. 29, 2014, which claims priority to Japanese Patent Application No. 2013-212487 filed Oct. 10, 2013, the contents of which are incorporated herein by reference in their entirety.

BACKGROUND

Technical Field

The present invention relates to a vehicle management system and a vehicle management method.

Related Art

A vehicle sharing system is known which manages vehicles in response to reservations from users and regulates return spaces to which the vehicles are to be returned after being used by the users. This vehicle sharing system employs a technique of acquiring positional information of a vehicle on the basis of GPS signals and determining that the vehicle has been returned only when the acquired positional information of the vehicle coincides with positional information of a predetermined return space for the vehicle (Patent Document 1).

[Patent Document 1] JP 2011-128987 A

SUMMARY

However, the above vehicle sharing system monitors only the remaining amount of fuel in an onboard device of a vehicle, and does not perceive the remaining amount of energy for the vehicle in a server that manages the vehicle. Therefore, the vehicle sharing system cannot perceive that which vehicle should be supplied with energy among a plurality of vehicles which are parked in respective parking spaces. Thus, the management capability for the vehicles is not sufficient in such a system.

A vehicle management system according to one or more embodiments of the present invention, and a vehicle management method according to one or more embodiments of the present invention may improve the management capability for vehicles.

A method according to one or more embodiments of the present invention comprises acquiring energy information that indicates a remaining amount of energy from vehicles; comparing the acquired remaining amount with a remaining amount threshold that represents a shortage of the energy; determining that the vehicle needs supply of the energy when the remaining amount of energy is lower than the remaining amount threshold; specifying the vehicle determined to need supply of the energy as a recovery vehicle (a vehicle to be out of service and to be retrieve); and outputting a recovery command for recovering the recovery vehicle from the parking space.

According to one or more embodiments of the present invention, a vehicle of which the remaining amount is insufficient is specified among a plurality of vehicles and a command is outputted for recovering the specified vehicle. An administrator or other person who confirms the command can perceive that the vehicle is in energy shortage. This can result in an improved management capability for the vehicles.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
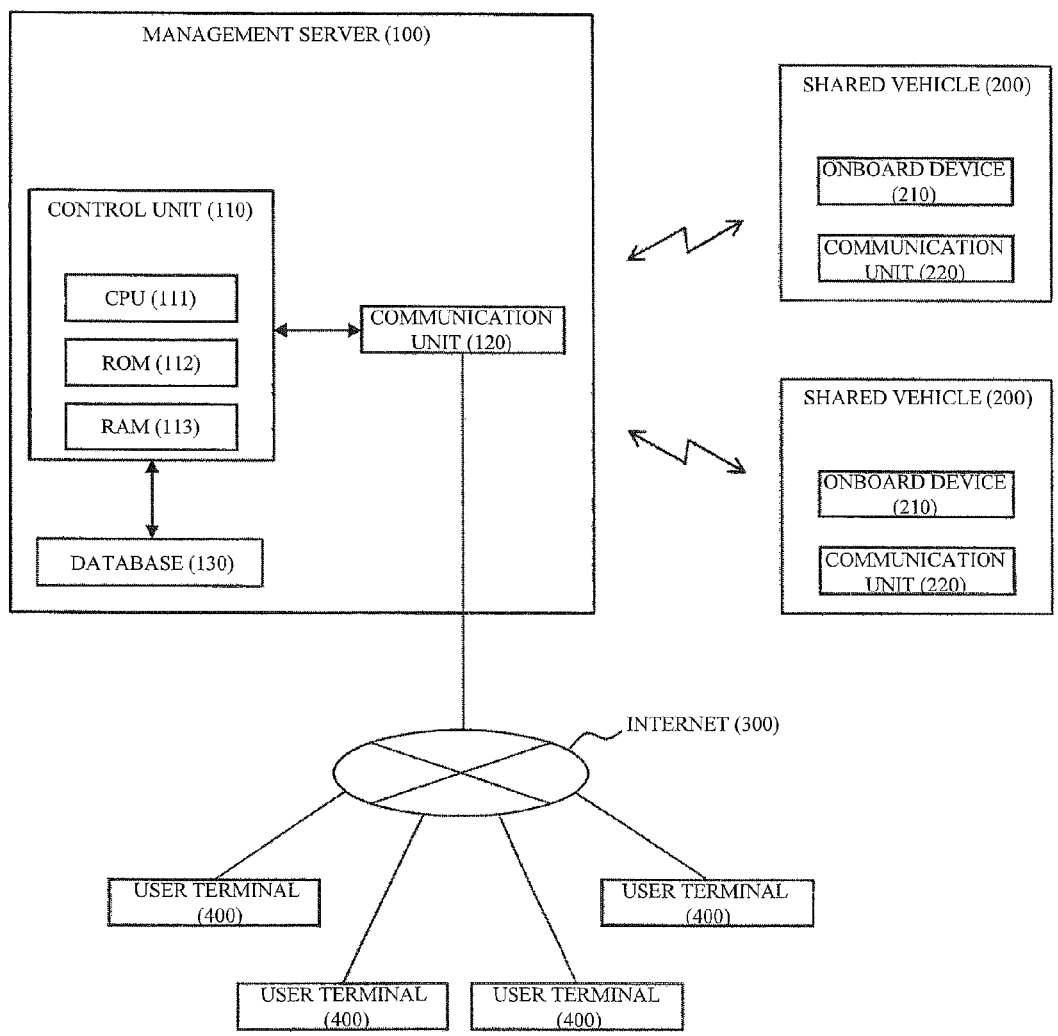
FIG. 1 is a configuration diagram of a vehicle sharing system according to one or more embodiments of the present invention.

FIG. 1 is the block configuration diagram of a vehicle sharing system according to one or more embodiments. As illustrated in FIG. 1, the vehicle sharing system according to one or more embodiments comprises: a management server 100; shared vehicles 200 provided for vehicle sharing service; and user terminals 400 that are communicable with the vehicle management server 100 through the Internet 300. In FIG. 1, while only two shared vehicles 200 are illustrated, the vehicle sharing system according to one or more embodiments is configured by many shared vehicles 200. In the vehicle sharing system according to one or more embodiments, many shared vehicles 200 are parked in predetermined parking spaces disposed at various places, and specified users can select and use the shared vehicles 200 parked in desired parking spaces.

As illustrated in FIG. 1, the shared vehicles 200 can communicate with the management server 100, and each of the shared vehicles 200 includes an onboard device 210 and a communication unit 220. The onboard device 210 transmits information of the shared vehicle 200, such as information of use start time and use end time, information of a traveling distance, information of the vehicle position, information of the vehicle speed, information of the remaining battery charge, and information of ON/OFF of the vehicle power switch, from the communication unit 220 to a communication unit 120 included in the management server 100 through wireless communication. The communication unit 220 receives information transmitted by signals from the management server 100.

The onboard device 210 can acquire the information of the vehicle position as below. For example, the onboard device 210 can acquire real-time position information of each shared vehicle 200 by receiving electric waves transmitted from positioning satellites using a global positioning system (GPS) for every predetermined time.

The user terminals 400 are terminals owned by specified users using the vehicle sharing system according to one or more embodiments. The user terminals 400 can communicate with the communication unit 120 through the Internet 300. The communication unit 120 is included in the management server 100. In the vehicle sharing system according to one or more embodiments, each user can make a use request for using a shared vehicle 200 with the user terminal 400.

Here, the use request for a shared vehicle 200 may be a request for an immediate use or a request for a reservation. The request for an immediate use is a request for using a shared vehicle 200 immediately after the user's request for the use. The request for a reservation is a request for using a shared vehicle 200 in the future.

In addition, in the vehicle sharing system according to one or more embodiments, when making a use request for a shared vehicle 200 using the user terminal 400, the user performs setting of a planned return space. Here, the planned return space is a space to which the user returns the shared vehicle 200 after use.

As examples of the user terminals 400, there are various mobile terminals such as cellular phones and PDAs in addition to personal computers. When the user terminal 400 is a cellular phone, the user terminal 400 may read the vehicle information which is transmitted from the communication unit 120 through wireless communication based on various wireless device standards, and the user terminal 400 may transmit the vehicle information and other necessary information to the management server 100. In FIG. 1, for example, while four terminals are illustrated as the user terminals 400, both the number of user terminals 400 and the number of users using the vehicle sharing system are not particularly limited.

The management server 100 includes a control unit 110, a communication unit 120 and a database 130.

The communication unit 120 is a device used for communicating with the communication unit 220 included in each shared vehicle 200 through wireless communication. The communication unit 120 is a device for communicating with the user terminal 400 owned by each user through the Internet 300. The communication unit 120 acquires the information of use start time and use end time, the information of a traveling distance, the information of the vehicle position, and the like related to the shared vehicle 200 from the onboard device 210 through wireless communication. The communication unit 120 acquires the information of a user's request for using a shared vehicle 200, the information of a planned return space selected by the user, and the like from the user terminal 400. Examples of the information of the user's request include information of a vehicle desired for use, use history of the service, member registration information, and the like.

The database 130 is a storage device for storing use acceptance information, planned return space information, positional information of parking spaces during parking, and the like for each shared vehicle 200. Here, each of the use acceptance information and the planned return space information is information that is generated for each shared vehicle 200 on the basis of information transmitted from the user terminal 400 when the user makes a use request for a shared vehicle 200 and selects an available vehicle and a planned return space through the user terminal 400. The positional information of parking spaces during parking include information of locations of parking spaces in which non-reserved vehicles are parked and information of locations of parking spaces in which vehicles that are reserved but before start of use are parked. When users of the vehicle sharing system are limited to the members, the database 130 also stores information of the registered members, identification information of the user terminals 400 registered by members, and other necessary information.

Figure 2:
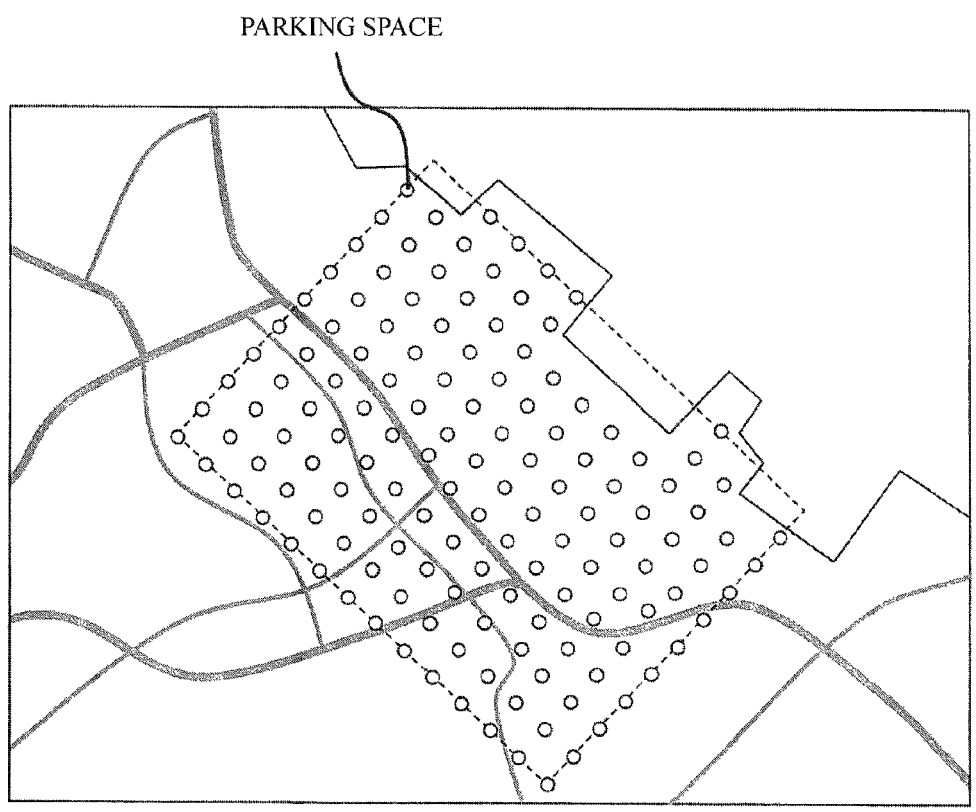
FIG. 2 is a diagram illustrating an example in which parking spaces are arranged in a predetermined district.

In addition, in the database 130, information of parking spaces used for parking the shared vehicles 200 is stored. For example, as illustrated in FIG. 2, in the database 130, positional information of parking spaces disposed in a predetermined district surrounded by broken lines on the map are stored. In the vehicle sharing system according to one or more embodiments, such parking spaces are parking lots used for parking the shared vehicles 200, and the shared vehicles 200 are parked in some of the parking spaces. As a user makes a use request through the user terminal 400, a desired shared vehicle 200 can be used.

The control unit 110 of the management server 100, as illustrated in FIG. 1, includes: a read only memory (ROM) 112 in which various programs are stored; a central processing unit (CPU) 111 as an operation circuit executing a program stored in the ROM 112; and a random access memory (RAM) 113 serving as an accessible memory device.

Figure 3:
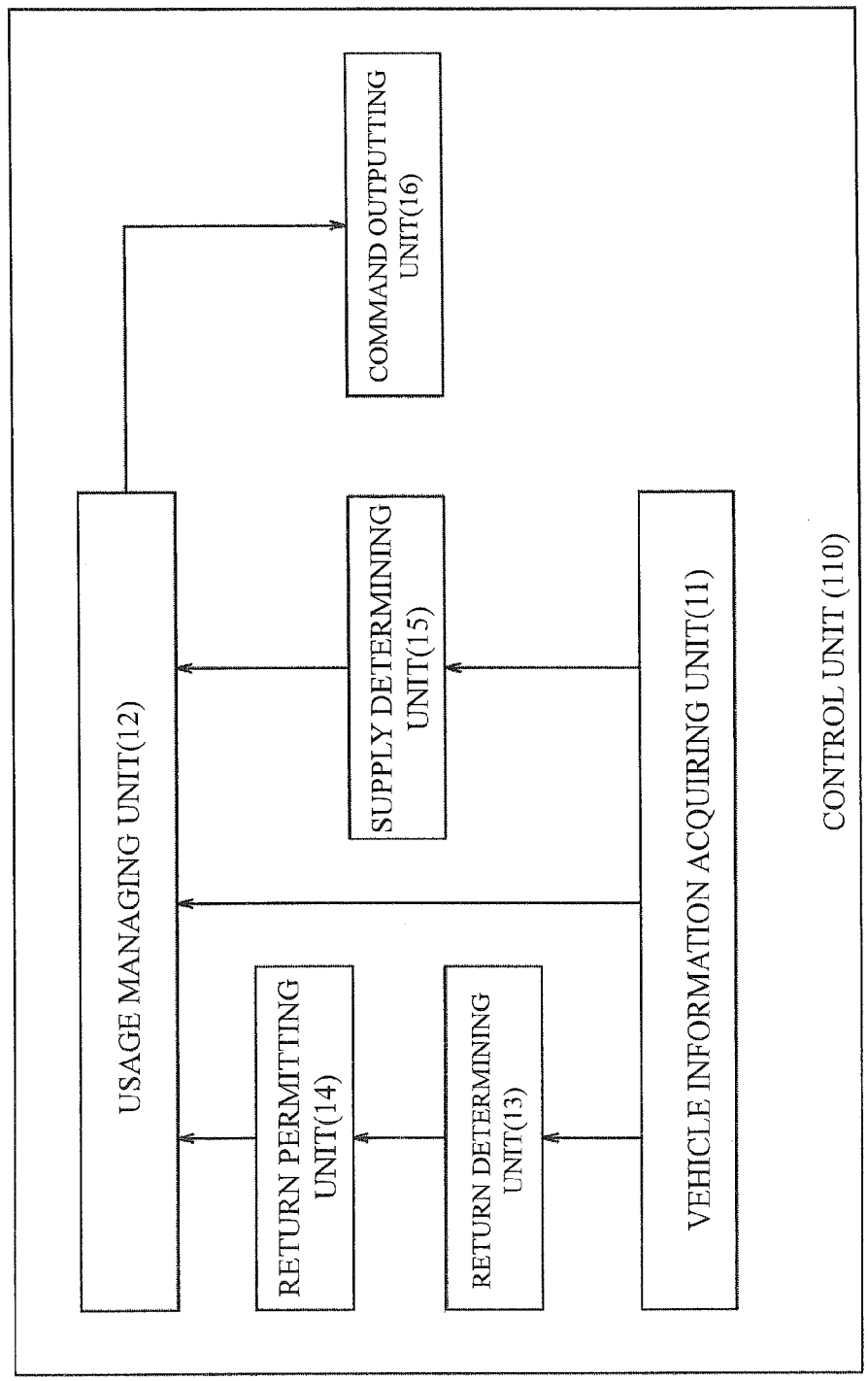
FIG. 3 is a block diagram illustrating a configuration of a control unit.

In order to manage the vehicle sharing system according to one or more embodiments, the control unit 110 has an information acquiring function to acquire information from the vehicles, a usage managing function to manage the use and reservation for use of the vehicles, a return determining function, a return permitting function, a supply determining function, and a command outputting function. The control unit 110 can execute each of the functions described above by cooperative processes of software used for realizing each of the functions and the hardware described above. As illustrated in FIG. 3, the control unit 110 has a vehicle information acquiring unit 11, a usage managing unit 12, a return determining unit 13, a return permitting unit 14, a supply determining unit 15, and a command outputting unit 16. FIG. 3 is a block diagram illustrating functional blocks of the control unit 110.

Figure 4:
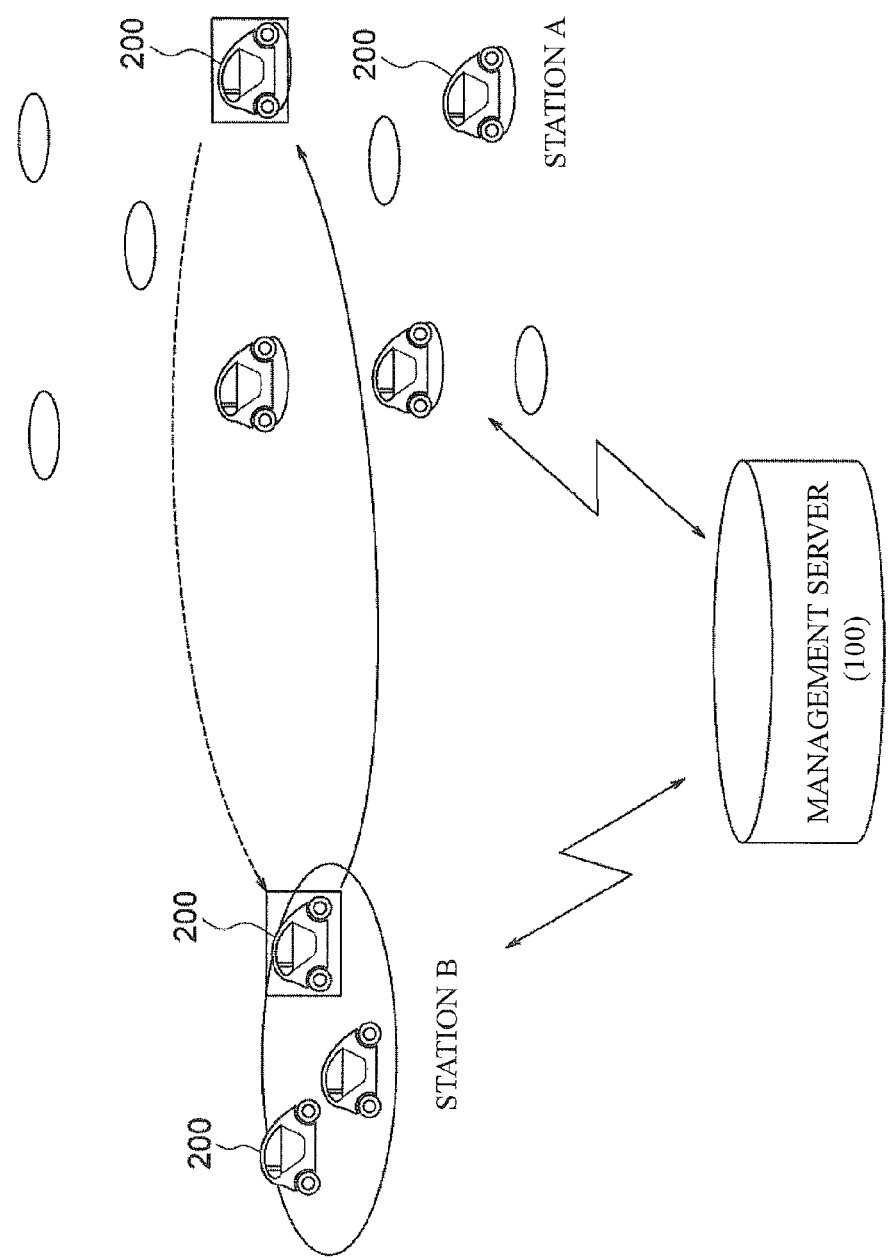
FIG. 4 is a schematic diagram illustrating the vehicle sharing system according to one or more embodiments of the present invention.

Here, a utilization form of the vehicle sharing system of this example will be described with reference to FIG. 4. FIG. 4 is a schematic diagram illustrating the vehicle sharing system according to one or more embodiments.

In the vehicle sharing system of one or more embodiments, a station (station A) for the purpose of use of the vehicles by users and a station (station B) for supplying the shared vehicles 200 with energy are independently managed. Each station is provided with a plurality of parking spaces in which the shared vehicles 200 are parked. The station A is configured of a plurality of ports, which are arranged at locations which are geographically separated from one another. Each port is provided with one or more parking spaces.

The user selects a shared vehicle 200 to use from the shared vehicles 200 parked in the ports included in the station A. The user also selects a departure place and a destination of the shared vehicle 200 to use from the ports of the station A. The departure place of the shared vehicle 200 is a space in which the shared vehicle 200 to use is parked.

The station B is provided with supply facilities for supplying the shared vehicles 200 with energy. For example, when the shared vehicles 200 are electric vehicles, the supply facilities are charging facilities. On the other hand, when the shared vehicles 200 are vehicles in which only the engines are the power sources, the supply facilities are fuel supply facilities. The following description of one or more embodiments will be directed to a case in which the shared vehicles 200 are electric vehicles and the supply facilities are charging facilities.

An administrator who manages the vehicle sharing system moves a shared vehicle 200 parked in each port of the station A to the station B. In the station B, the administrator charges the battery of the shared vehicle 200 using the charging facility.

In the parking spaces of the station B, the shared vehicles 200 for which the charging has been complete are parked as substitute vehicles. After moving the shared vehicle 200 from the station A to the station B, the administrator moves the substitute vehicle waiting in the station B to the station A. In this operation, the parking position for the substitute vehicle is the parking space in which the shared vehicle 200 has been parked before moving from the station A to the station B. This allows exchange of vehicles between the stations A and B, and another vehicle available to a user is given in the station A without waiting the completion of charging of the shared vehicle 200. This can result in prevention of shortage of the shared vehicles 200 available in the station A.

Hereinafter, each function realized by the control unit 110 of the management server 100 will be described with reference to FIG. 3 and FIG. 4. Control of the vehicles will also be described as necessary.

First, the usage managing function will be described. The control unit 110 of the management server 100 accepts a request (reservation) for use of a vehicle from a user. Specifically, when the user operates the user terminal 400 to make a use request for a shared vehicle 200, the control unit 110 uses the vehicle information acquiring unit 11 to acquire the information of the use request transmitted from the user terminal 400 so as to accept the use request.

Subsequently, the usage managing unit 12 of the control unit 110 confirms usage situation of the shared vehicles 200 which are managed. The usage managing unit 12 manages an usage state of a plurality of shared vehicles 200 for each parking space.

Examples of the usage state of each shared vehicle 200 include a state in which the vehicle is currently used, a state in which the vehicle has been reserved, a state in which the vehicle is not reserved, and a state in which the use and reservation of the vehicle are not accepted because the capacity of battery is not sufficient. The usage managing unit 12 also manages the state of each shared vehicle 200 in the station B in addition to the state of each shared vehicle 200 in the station A. When managing the state of each shared vehicle 200 in the station B, the usage managing unit 12 manages a charged state such as the start of charging, during charging, and the completion of charging of the battery provided in the shared vehicle 200, as the usage state.

When a request for use is made by a user, the usage managing unit 12 sets one or more vehicles which are not reserved (unreserved vehicles) among the vehicles parked in the parking spaces of the station A, to available vehicles. The available vehicles do not include vehicles in a state in which the use and reservation are not accepted for shortage of battery charge, the vehicle is being used, or the vehicle is reserved.

The usage managing unit 12 makes a list of available vehicles and then uses the communication unit 120 to transmit the list of available vehicles to the user who makes the request for use. The user can confirm the available vehicles and parking positions of the available vehicles by watching the list on a display screen of the user terminal 400.

When receiving the information of the use request for a shared vehicle 200 through the communication unit 120, the usage managing unit 12 confirms usage situation of parking spaces which are managed by the control unit 110.

Examples of the usage state of each parking space include a state in which a vehicle is currently parked in the parking space, a state in which the parking space has been reserved as a planned space of arrival, and a state in which the parking space is not reserved. Examples of the usage state may further include a state in which the parking and reservation are not accepted, such as a case in which paving work is performed for the parking space, for example.

When a request for use is made by a user, the usage managing unit 12 sets one or more unreserved parking spaces among the managed parking spaces, to returnable spaces. No vehicles are parked in the unreserved parking spaces and planned return spaces (destinations) for vehicles are not set in the unreserved parking spaces.

The usage managing unit 12 makes a list of returnable spaces and then uses the communication unit 120 to transmit the list of returnable spaces to the user who makes the request for use. Receiving the list, the user can confirm the returnable spaces and locations of the returnable spaces by watching the list on a display screen of the user terminal 400.

As above, the usage managing unit 12 sets both the available vehicles and the returnable spaces among the shared vehicles 200 and parking spaces which are managed. However, when the available vehicles cannot be set or when the returnable spaces cannot be set, the usage managing unit 12 determines that the reservation of a vehicle cannot be made, and the usage managing unit 12 transmits a signal indicating that the reservation cannot be made (a signal indicating that the service is not available) to the user through the communication unit 120.

On the other hand, when one or more available vehicles can be set and when one or more returnable spaces can be set, the usage managing unit 12 determines a state in which the reservation of an available vehicle can be made.

When the user selects a reserved vehicle from the list of available vehicles, the user terminal 400 transmits information of the reserved vehicle which is selected to the communication unit 120. The usage managing unit 12 sets the reserved vehicle from the list of available vehicles. In addition, when the user selects a planned return space from the list of returnable spaces, the user terminal 400 transmits a signal indicating the planned return space which is selected to the communication unit 120. The usage managing unit 12 sets a planned return space from the list of returnable spaces.

After setting the reserved vehicle and planned return space, the usage managing unit 12 fixes the reservation and transmits the fixed information to the user. In addition, the usage managing unit 12 stores the fixed reservation information in the database 130 while associating the fixed reservation information with the identification information of the user who makes the reservation. The reservation information includes identification information of the reserved vehicle, identification information of the planned return space, information of the use start time and planned return time, and other necessary information. The identification information of the user may be registration information of the user or may also be identification information of the user terminal 400 used by the user when making the reservation. In addition, when fixing the reservation, the usage managing unit 12 transmits the identification information of the user and the reservation information to the communication unit 220 of the reserved vehicle.

When using the reserved vehicle, the user holds the user terminal 400 over a reader which is a part of the onboard device 210 of the shared vehicle 200 so that the communication can be established between the shared vehicle 200 and the user terminal 400. The onboard device 210 of the reserved vehicle performs authentication by comparing the read identification information with the identification information transmitted from the management server 100 after the reservation of the vehicle. When the use of the reserved vehicle is permitted as a result of the authentication, the onboard device 210 opens the lock mechanism for the doors. This allows the user to use the reserved vehicle.

When permitting the use by the authentication, the onboard device 210 of the reserved vehicle transmits a signal indicating that the use of the vehicle will be started, to the management server 100 through the communication unit 220. The control unit 110 of the management server 100 receives the signal from the vehicle with the communication unit 120 so as to acquire the information indicating that the use of the vehicle is started.

In addition, the usage managing unit 12 manages the vehicle being used by using the communication unit 120 to communicate with the vehicle being used and by using the vehicle information acquiring unit 11 to acquire the vehicle information. The acquired vehicle information is transmitted from the vehicles which are being used, and includes the positional information of the vehicle and the information of the charging state of battery.

The information of battery is managed by a control unit (controller) which is a part of the onboard device 210 of the shared vehicle 200. The usage managing unit 12 also manages the state of battery of the vehicle which is being used, on the basis of the information of battery acquired by the vehicle information acquiring unit 11. The information of the charging state of battery includes the remaining charge of the battery and the state of charge (SOC) of the battery.

Next, the return determining function of the return determining unit 13 will be described. When a user returns a shared vehicle (reserved vehicle) 200 after using it, the return determining unit 13 determines whether or not the shared vehicle 200 is returned to a planned return space which has been set. More specifically, first, the return determining unit 13 acquires the planned return space information for the returned shared vehicle 200 by extracting the planned return space information from the information stored in the database 130. Then, the return determining unit 13 compares the positional information of the shared vehicle 200 obtained by the vehicle information acquiring unit 11 with the planned return space information The return determining unit 13 determines that the shared vehicle 200 has been returned to the planned returned space when the position of the shared vehicle 200 is located in the planned return space.

Next, the return permitting function of the return permitting unit 14 will be described. When determining that the shared vehicle 200 has been returned to the planned return space, the return permitting unit 14 permits the user's return of the shared vehicle 200 and notifies the user of the completion of returning the shared vehicle 200 through the user terminal 400. The process of returning the shared vehicle 200 is thus completed.

The description will then be directed to the supply determining function of the supply determining unit 15, the command outputting function of the command outputting unit 16, and the management function performed by the usage managing unit 12 for vehicles which need supply. As described above, when the vehicle is returned to the planned return space, the vehicle information acquiring unit 11 acquires the information of battery of the returned vehicle. The supply determining unit 15 compares the remaining charge of the battery provided in the returned vehicle with a remaining charge threshold. The remaining charge of the battery provided in the returned vehicle is indicated by the acquired information of battery. The remaining charge threshold represents a capacity shortage of the battery. The remaining charge threshold corresponds to a remaining charge of the battery by which the user can use the shared vehicle 200 without charging. The remaining charge threshold is determined, for example, in accordance with a traveling distance which is estimated for the user to use the vehicle once in the vehicle management system.

The supply determining unit 15 determines that charge of the battery is not needed when the acquired remaining charge of battery is not lower than the remaining charge threshold. The supply determining unit 15 determines that the returned shared vehicle 200 needs charge of the battery when the acquired remaining charge of battery is lower than the remaining charge threshold. The supply determining unit 15 specifies the shared vehicle 200 which is determined (vehicle parked in the planned return space), as a recovery vehicle (a vehicle to be out of service and to be retrieve). In addition, the supply determining unit 15 sends the information of the shared vehicle 200 which includes battery needed for a charge together with the positional information of the shared vehicle 200 (positional information of the parking space in which the shared vehicle 200 is parked) to the usage managing unit 12.

The usage managing unit 12 acquires the information from the supply determining unit 15 and records the information of the recovery vehicle in the database 130 while excluding the shared vehicle 200 specified as the recovery vehicle from the available vehicles. This allows the control unit 110 of the management server 100 to manage the vehicles so that the user does not use the recovery vehicle, because the recovery vehicle is not set to the reserved vehicle. In addition, the usage managing unit 12 outputs the information of the shared vehicle 200 specified as the recovery vehicle to the command outputting unit 16. In addition, the information of the recovery vehicle may be transmitted from the supply determining unit 15 to the command outputting unit 16.

Next, the command outputting function of the command outputting unit 16 will be described. The command outputting unit 16 acquires the information of the recovery vehicle from the usage managing unit 12 and then transmits the information of the recovery vehicle through the communication unit 120 so as to output a recovery command to an administrator. The recovery command is a command for recovering the recovery vehicle from the parking space by the administrator. The administrator checks the recovery command using a communication terminal owned by the administrator or an operation screen of the management server 100 so as to confirm that there is a shared vehicle which needs charge. In this operation, the administrator can also confirm the position of the recovery vehicle because the recovery command includes the positional information of the parking space for the recovery vehicle. Receiving the recovery command, the administrator then moves the recovery vehicle parked in the parking space from the station A to the station B for recovering the recovery vehicle (this operation is represented by the dashed arrow in FIG. 4).

When a substitute vehicle is parked in a parking space, the administrator moves the substitute vehicle from the station B to the station A and parks the substitute vehicle in the parking space in which the recovery vehicle is parked (this operation is represented by the solid arrow in FIG. 4). The battery of the substitute vehicle has been sufficiently charged, and the remaining charge of the battery is at least higher than the remaining charge threshold. In addition, when outputting the recovery command, the command outputting unit 16 notifies the administrator of the positional information of the parking space. The positional information indicates a parking position of the substitute vehicle parked in the station B.

The usage managing unit 12 also manages the position of the substitute vehicle and determines whether or not the substitute vehicle is parked in a particular parking space. The particular parking space is the parking space in which the recovery vehicle is parked before the recovery vehicle is recovered in the station B. The usage managing unit 12 sets the substitute vehicle to an available vehicle when determining that the substitute vehicle is parked in the particular parking space. Thus, the substitute vehicle is moved from the station B to the station A and comes to be an available vehicle which a user can start to use in the station A.

In addition, the usage managing unit 12 manages the position of the shared vehicle 200 specified as a recovery vehicle and also manages whether or not charge of the battery of the shared vehicle 200 has been completed. After parking the recovery vehicle in a parking space in the station B, the administrator connects a charging cable of the charging facilities in the station B to the recovery vehicle for starting charge of the battery. At this moment, the terminal used by the administrator or the onboard device 210 of the recovery vehicle transmits a signal indicating start of charge to the management server 100.

When receiving the signal indicating start of charge from the recovery vehicle through the communication unit 120, the usage managing unit 12 turns on a timer for measuring the charging time. When the time measured by the timer reaches a predetermined time, the usage managing unit 12 determines that the charge of battery of the recovery vehicle has been completed. The predetermined time is a preliminarily set time and may be, for example, a period of time required for the battery to be charged from the remaining charge threshold to a limit capacity. The limit capacity is a battery capacity that allows the battery to be fully used in the vehicle sharing system.

When the usage managing unit 12 determines that the charge of battery of the recovery vehicle has been completed, the usage managing unit 12 sets the recovery vehicle of which the charge has been completed to a substitute vehicle. The substituted vehicle 200 is substituted for another recovery vehicle that needs charge of the battery.

Figure 5:
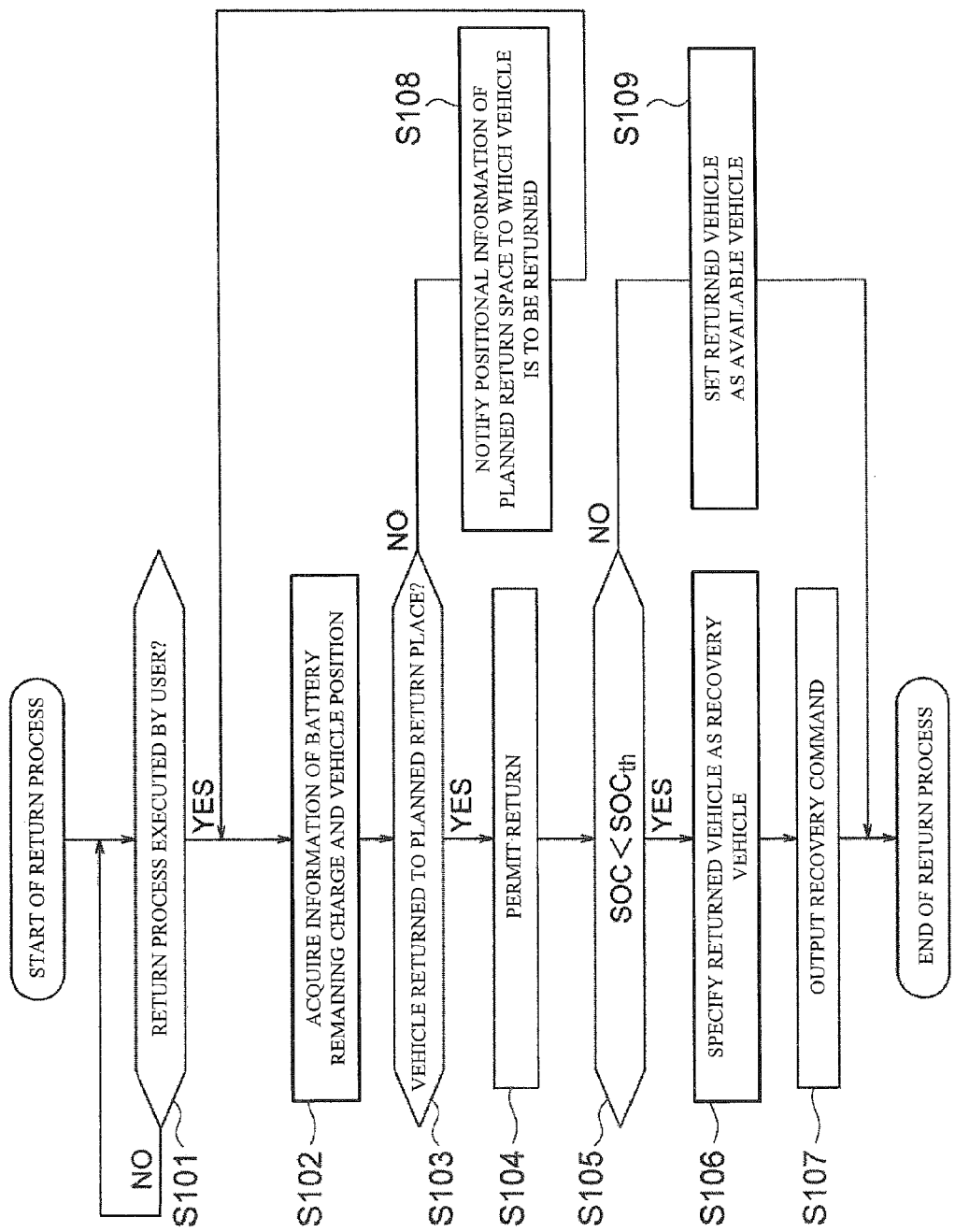
FIG. 5 is a flowchart illustrating a return process in one or more embodiments of the present invention.

Next, the process of a return process for a shared vehicle in one or more embodiments will be described. FIG. 5 is a flowchart that illustrates an example of the process when executing the return process for a shared vehicle 200 in one or more embodiments.

In step S101, the control unit 110 of the management server 100 determines, whether or not the return process for a shared vehicle 200 is executed by any user. The control unit 110 communicates with the shared vehicle 200 through the user terminals 400. When the return process for a shared vehicle 200 is executed by any user, the process proceeds to step S102. When the return process for a shared vehicle 200 is not executed by any user, the routine waits in step S101.

In step S102, the control unit 110 of the management server 100 uses the vehicle information acquiring unit 11 to acquire the information of the battery remaining charge of the shared vehicle 200 and the positional information of the shared vehicle 200. The shared vehicle 200 is a vehicle for which the return process is executed. In step S103, the control unit 110 of the management server 100 determines whether or not the shared vehicle 200 is located at a set planned return space, on the basis of the information of the current position of the shared vehicle 200 acquired in step S102. When determining that the shared vehicle 200 is located in the set planned return space, the process proceeds to step S104. When determining that the shared vehicle 200 is not located in the set planned return space, the process proceeds to step S108.

In step S104, the control unit 110 of the management server 100 uses the return permitting unit 14 to permit the return of the shared vehicle 200. In step S105, the control unit 110 uses the supply determining unit 15 to compare the remaining charge (SOC) of the battery acquired in step S102 with a remaining charge threshold ($SOC_{th}$). The remaining charge threshold ($SOC_{th}$) is a threshold for determining that whether or not charge of the battery is needed. When the remaining charge (SOC) of the battery is lower than the remaining charge threshold ($SOC_{th}$), the supply determining unit 15 determines that charge is needed, and the process proceeds to step S106. When the remaining charge (SOC) of the battery is not lower than the remaining charge threshold ($SOC_{th}$), the supply determining unit 15 determines that charge is not needed, and the process proceeds to step S109.

In step S106, the usage managing unit 12 of the control unit 110 specifies the vehicle determined to need charge, as a recovery vehicle. In addition, the usage managing unit 12 excludes the specified recovery vehicle from the available vehicles. In step S107, the control unit 110 uses the command outputting unit 16 to output a recovery command to an administrator such that the administrator recovers the specified recovery vehicle from the parking space in which the specified recovery vehicle is parked.

Referring again to step S103, when determining that the shared vehicle 200 is not located at the set planned return space, the process proceeds to step S108. In S108, the control unit 110 of the management server 100 provides the user with the positional information of the planned return space and also notifies the user to return the shared vehicle 200 of the planned return space through the user terminal 400. The positional information indicates a position of the planned return space to which the user should return the shared vehicle 200.

Referring again to step S105, when the remaining charge (SOC) of the battery is not lower than the remaining charge threshold ($SOC_{th}$), the process proceeds to step S109. In step S109, the usage managing unit 12 sets the shared vehicle 200 returned to the planned return space, to an available vehicle.

Figure 6:
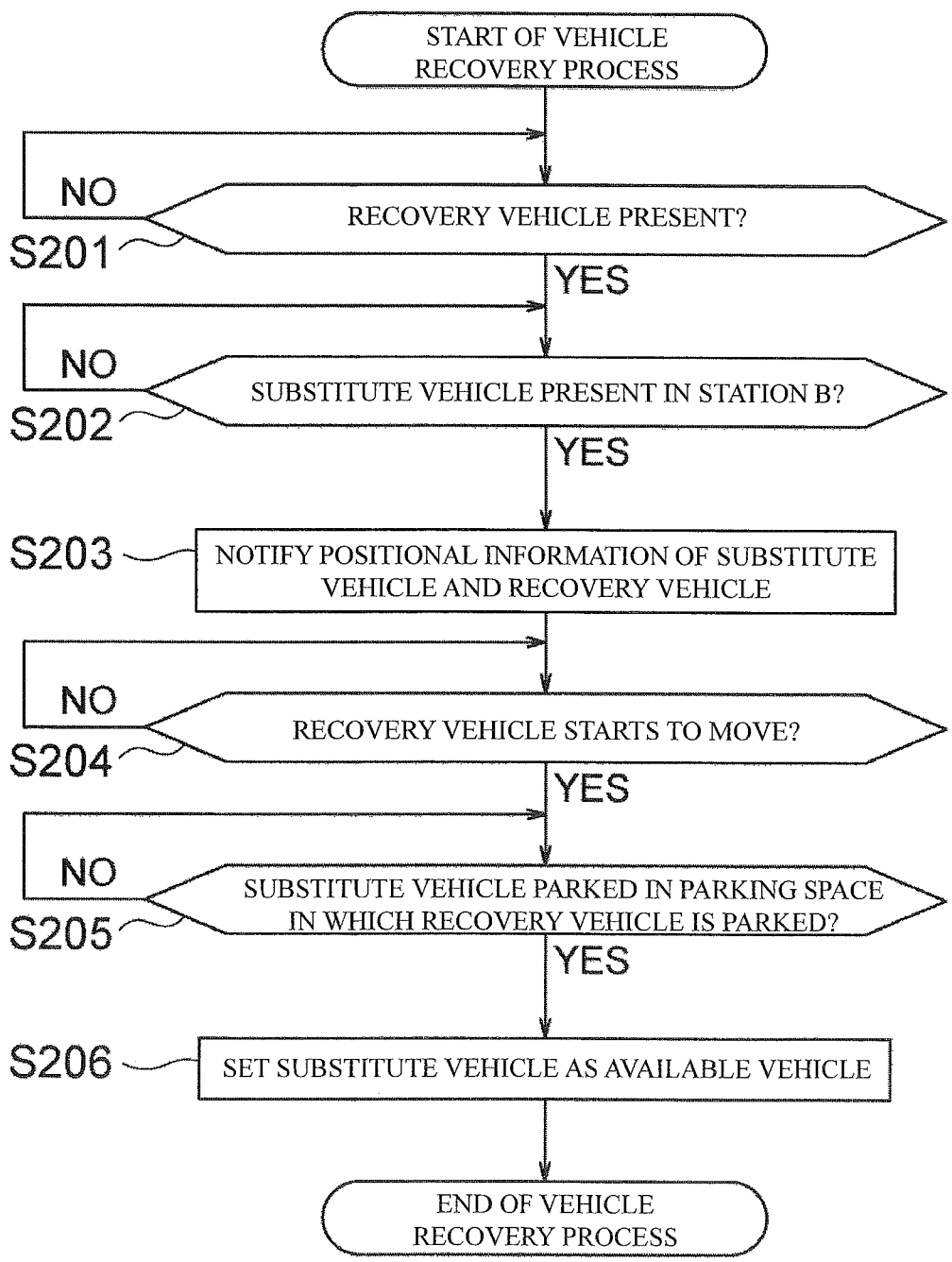
FIG. 6 is a flowchart illustrating a vehicle recovery process in one or more embodiments of the present invention.

Next, the operation of a recovery process for a shared vehicle in one or more embodiments will be described. FIG. 6 is a flowchart that illustrates an example of the process when executing the recovery process for a shared vehicle 200 in one or more embodiments.

In step S201, the control unit 110 of the management server 100 determines whether or not a recovery vehicle is present. When a recovery vehicle is specified in step S106, a recovery vehicle is present. When a recovery vehicle is present, the process proceeds to step S202. When a recovery vehicle is not present, the process waits in step S201.

In step S202, the usage managing unit 12 of the control unit 110 determines whether or not a substitute vehicle is parked in the station B. The substitute vehicle is a vehicle which can be a substitute vehicle among the shared vehicle 200 parked in the station B. When the substitute vehicle is parked, the process proceeds to step S203. When the substitute vehicle is not parked, the process waits in step S202 until other substitute vehicle is present. Here, the case in which the substitute vehicle is not parked corresponds to a state in which shared vehicles 200 are parked in the station B, but the charge of battery in each of shared vehicles 200 has not been completed, or the like.

In step S203, the command outputting unit 16 of the control unit 110 notifies the administrator of the positional information of the recovery vehicle and the positional information of the substitute vehicle by transmitting a signal from the communication unit 120.

In step S204, the usage managing unit 12 determines whether or not the recovery vehicle moves from the parking space in which the recovery vehicle is parked, on the basis of the positional information of the recovery vehicle. When the recovery vehicle moves from the parking space, the process proceeds to step S205 while the usage managing unit 12 determines that the recovery vehicle starts to move. When the recovery vehicle does not move from the parking space, the process waits in step S204.

In step S205, the usage managing unit 12 determines whether or not the substitute vehicle is parked in the parking space in which the recovery vehicle is parked, on the basis of the positional information of the substitute vehicle. When the substitute vehicle is parked in the parking space in which the recovery vehicle is parked, the process proceeds to step S206. When the substitute vehicle is not parked in the parking space in which the recovery vehicle is parked, the process waits in step S205.

In step S206, the usage managing unit 12 sets the substitute vehicle to an available vehicle. This allows the recovery vehicle to be changed with another shared vehicle 200 which is available.

Figure 7:
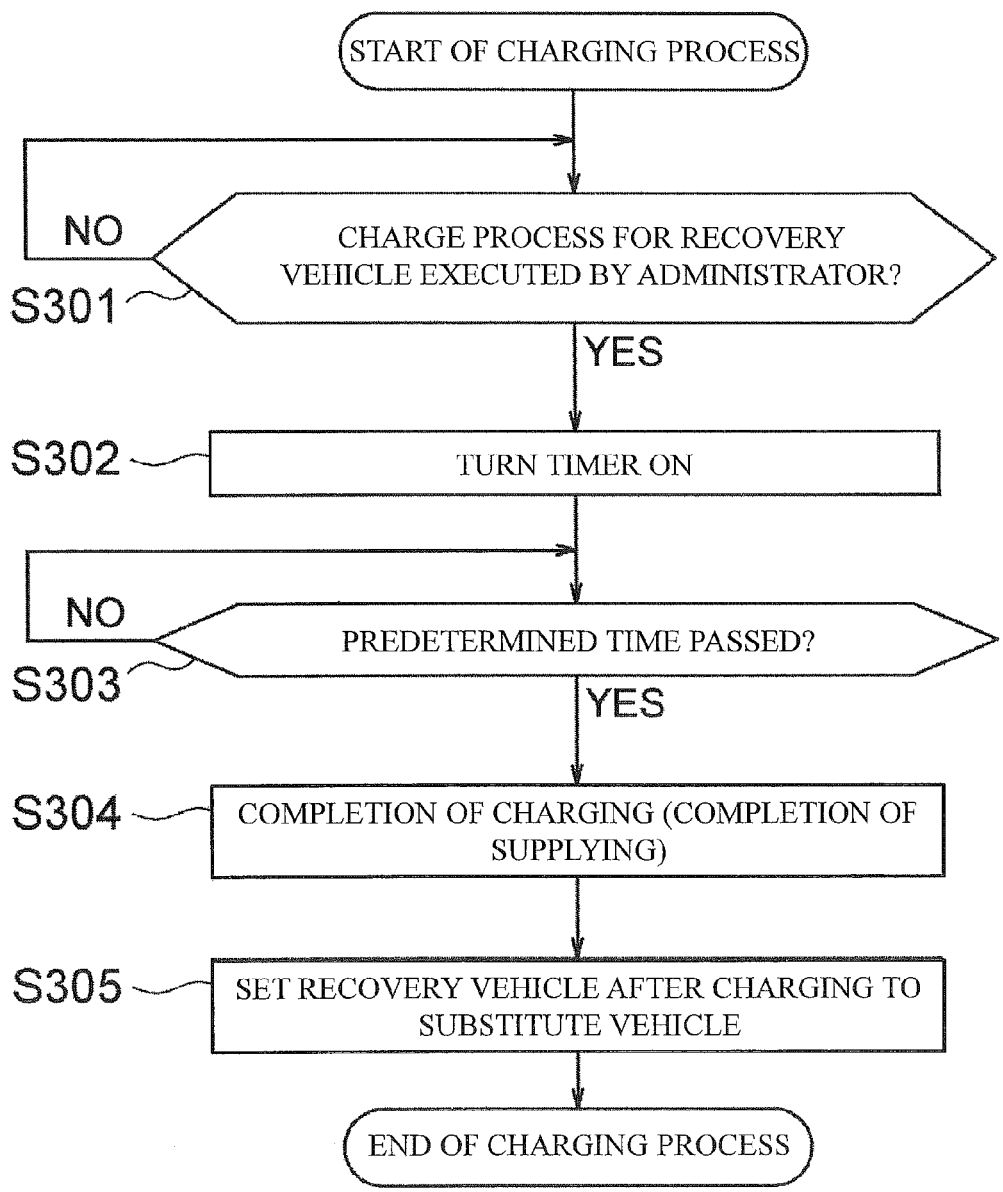
FIG. 7 is a flowchart illustrating a charge process in one or more embodiments of the present invention.

Next, the operation of a charge process for a shared vehicle in one or more embodiments will be described. FIG. 7 is a flowchart that illustrates an example of the process when executing the charge process for a shared vehicle 200 in one or more embodiments.

In step S301, the control unit 110 of the management server 100 determines whether or not the charge process for the recovery vehicle is executed by the administrator. The control unit 110 executes the process in step S301 through a communication terminal owned by the administrator or through the charging device of the charging facilities. When the charge process is executed, the process proceeds to step S302. When the charge process is not executed, the routine waits in step S301.

In step S302, the control unit 110 of the management server 100 uses the vehicle information acquiring unit 11 to acquire the information of starting the battery charge of the recovery vehicle, and then turns a timer on. In step S303, the usage managing unit 12 compares the time measured by the timer with a predetermined time so as to determine whether or not the measured time reaches the predetermined time. When the predetermined time has passed, the process proceeds to step S304. When the predetermined time has not passed, the process waits in step S303.

In step S304, the control unit 110 of the management server 100 determines that the charge of battery has been completed. In step S305, the usage managing unit 12 of the control unit 110 sets the recovery vehicle of which the charge has been completed, to a substitute vehicle.

As above, in one or more embodiments, the vehicle management system acquires energy information (represented by the battery information) which indicates a remaining amount of energy from vehicles and compares the acquired remaining amount of energy with a remaining amount threshold (represented by the remaining charge threshold) which represents a shortage of the energy. The vehicle management system determines that supply of the energy is needed when the remaining amount of energy is lower than the remaining amount threshold. The vehicle management system specifies the shared vehicle 200 determined to need supply of the energy as a recovery vehicle and outputs a recovery command for recovering the recovery vehicle from the parking space. In this way, the vehicle management system can determines whether or not the vehicle needs supply of energy without human operation as much as possible. An administrator or other qualified persons can perceive that the vehicle is in energy shortage by receiving the command.

It is possible to improve management capability for the vehicles in the vehicle management system.

In one or more embodiments, the vehicle management system sets a space a planned return space among the parking spaces and acquires the energy information of the vehicle from the vehicle returned to the planned return space. The planned return space is a space to which the user is to return the vehicle. In this way, the administrator can easily recover the vehicle because parking position of a determined vehicle is limited to the planned return space in a case that the vehicle management system determines that whether or not the determined vehicle needs supply of the energy.

In one or more embodiments, the vehicle management system acquires positional information of the parking space in which the vehicle is parked and output the recovery command such that the recovery command includes the positional information of the parking space for the recovery vehicle. In this way, the administrator or other qualified persons who receives the command can easily perceive the position of the vehicle to be recovered and can easily recover the vehicle.

In one or more embodiments, the vehicle management system manages a position of a substitute vehicle for the recovery vehicle and a position of the recovery vehicle, and sets the substitute vehicle to an available vehicle when the substitute vehicle is parked in a particular parking space. The available vehicle is a vehicle which can be used by the user and the particular parking space is a parking space in which the recovery vehicle is parked before the recovery vehicle is recovered. In this way, when the shared vehicle (recovery vehicle) 200 which needs energy supply is changed with the shared vehicle (substitute vehicle) 200 which has sufficient energy, the substitute vehicle can be in a state capable of being used by a user.

In one or more embodiments, the vehicle management system acquires charge information of a battery of the recovery vehicle from the recovery vehicle and determines whether or not charging of the battery of the recovery vehicle is completed, on the basis of the acquired charge information. In this way, the charging state of battery of the recovery vehicle can be managed.

In one or more embodiments, when determining that the charging of the battery of the recovery vehicle is completed, the vehicle management system set a charged recovery vehicle to the substitute vehicle. The charged recovery vehicle is a vehicle for which the charging is completed and the substitute vehicle is substituted for a vehicle which needs supply of the energy. In this way, the recovery vehicle after completion of the charging can be specified as a vehicle to be changed, and the use efficiency of vehicles can be improved in the vehicle sharing system.

In one or more embodiments, the vehicle management system sets unreserved vehicles among the vehicles to available vehicles and excludes the recovery vehicle from the available vehicles. In this way, vehicles which need supply of the energy can be excepted from the vehicles to be used by users.

In one or more embodiments, the vehicle management system sets a planned return space among the parking spaces when the user's request is accepted. The planned return space is a space to which the user is to return the vehicle after using the vehicle. The vehicle management system permits return of the vehicle when determining that the vehicle is returned to the planned return space. In this way, the administrator or other qualified persons can easily recover the vehicle because the spaces for return are limited to specific parking spaces.

In one or more embodiments, when the vehicle management system determines that whether or not a determined vehicle needs supply or energy, the determined vehicle may not be a shared vehicles 200 returned to the planned return spaces but the shared vehicles 200 parked in other parking spaces and the shared vehicles 200 which are traveling.

In one or more embodiments, after receiving a signal indicating the start of charging from the recovery vehicle through the communication unit 120, the control unit 110 of the management server 100 may receive a signal indicating the completion of charging from the charging device of the charging facilities and determine the completion of charging the battery of the recovery vehicle in accordance with confirmation of receiving the signal indicating the completion of charging. In one or more embodiments, after receiving a signal indicating the start of charging from the recovery vehicle through the communication unit 120, the control unit 110 of the management server 100 may receive a signal indicating the completion of charging from the recovery vehicle and the control unit 110 determines the completion of charging the battery of the recovery vehicle in accordance with confirmation of receiving the signal indicating the completion of charging.

The above usage managing unit 12 corresponds to a "usage managing unit" in one or more embodiments of the present invention, the above vehicle information acquiring unit 11 corresponds to an "acquisition unit" in one or more embodiments of the present invention, the above supply determining unit 15 corresponds to a "supply determining unit" in one or more embodiments of the present invention, the above return determining unit 13 corresponds to a "return determining unit" in one or more embodiments of the present invention, and the above return permitting unit 14 corresponds to a "return permitting unit" in one or more embodiments of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

11 Vehicle information acquiring unit
12 Usage managing unit
13 Return determining unit
14 Return permitting unit
15 Supply determining unit
16 Command outputting unit
100 Management server
110 Control unit
120 Communication unit
200 Shared vehicle
400 User terminal

The invention claimed is:

1. A vehicle management system for managing vehicles used by users, comprising:
a usage managing unit configured to:
accept a user's request to use one of the vehicles; and
manage the vehicles and parking spaces in which the vehicles are parked;
an acquisition unit configured to acquire energy information from the vehicles, the energy information indicating a remaining amount of energy used for traveling of the vehicle;
a determination unit configured to:
compare the remaining amount acquired by the acquisition unit with a remaining amount threshold that represents a shortage of energy;
determine that the vehicle needs supply of energy when the remaining amount is lower than the remaining amount threshold; and
specify a recovery vehicle that has been determined as needing supply of energy; and
a command outputting unit configured to output a recovery command for recovering the recovery vehicle from the parking space,
wherein the acquisition unit is configured to acquire positional information of the parking space, and
wherein the command outputting unit is configured to output the recovery command such that the recovery command includes the positional information for the recovery vehicle.

2. The vehicle management system according to claim 1, wherein the acquisition unit is configured to acquire information of a state of charge of a battery provided in the vehicle as the energy information.

3. The vehicle management system according to claim 1, wherein the usage managing unit is configured to set a planned return space among the parking spaces, the planned return space being a space to which the user is to return the one of the vehicles, and
wherein the acquisition unit is configured to acquire the energy information from the one of the vehicles returned to the planned return space by the user.

4. The vehicle management system according to claim 1, wherein the usage managing unit is configured to:
manage a position of a substitute vehicle for the recovery vehicle and a position of the recovery vehicle; and
set the substitute vehicle to an available vehicle when the substitute vehicle is parked in a particular parking space,
wherein the available vehicle is a vehicle which can be used by the user, and
wherein the particular parking space is the parking space in which the recovery vehicle is parked before the recovery vehicle is recovered.

5. The vehicle management system according to claim 1, wherein the acquisition unit is configured to acquire charge information of a battery in the recovery vehicle from the recovery vehicle, and
wherein the usage managing unit is configured to determine whether or not charging of the battery is completed on a basis of the charge information.

6. The vehicle management system according to claim 5, wherein the usage managing unit is configured to set a charged recovery vehicle to the substitute vehicle when determining that the charging of the battery in the charged recovery vehicle is completed,
wherein the substitute vehicle is substituted for a vehicle which needs supply of energy.

7. The vehicle management system according to claim 1, wherein the usage managing unit is configured to:
set unreserved vehicles among the vehicles to available vehicles; and
exclude the recovery vehicle from the available vehicles.

8. The vehicle management system according to claim 1, further comprising:
a return determining unit configured to determine whether or not the vehicle is returned to a planned return space when the vehicle is actually used and returned by the user; and
a return permitting unit configured to permit return of the vehicle when the return determining unit determines that the vehicle is returned to the planned return space,
wherein the usage managing unit is configured to set the planned return space among the parking spaces when the user's request is accepted, the planned return space being a space to which the user is to return the vehicle after using the vehicle.

9. A vehicle management method for managing vehicles used by users, comprising:
accepting a user's request for using the vehicle;
managing the vehicles and parking spaces in which the vehicles are parked;
acquiring energy information from the vehicles, the energy information indicating a remaining amount of energy used for traveling of the vehicle;
comparing the acquired remaining amount with a remaining amount threshold that represents a shortage of energy;
determining that the vehicle needs supply of energy when the acquired remaining amount is lower than the remaining amount threshold;
specifying the vehicle determined to need supply of energy as a recovery vehicle; and
outputting a recovery command for recovering the recovery vehicle from the parking space such that the recovery command includes the positional information for the recovery vehicle.

\* \* \* \* \*